US012418558B1

(12) United States Patent
Ding et al.

(10) Patent No.: US 12,418,558 B1
(45) Date of Patent: Sep. 16, 2025

(54) DETECTION OF MALICIOUS DOMAINS (71) Applicant: Amazon Technologies, Inc., Seattle, WA (US)

(72) Inventors: Jiahao Ding, Long Island City, NY (US); Abhinandan Dubey, Jersey City, NJ (US); Christopher Stinson, Columbia, MD (US); Jeffrey Earl Bickford, Thornton, CO (US); Baris Coskun, Glen Rock, NJ (US); MohamadAli Torkamani, Scarsdale, NY (US)

(73) Assignee: Amazon Technologies, Inc., Seattle, WA (US)

( * ) Notice: Subject to any disclaimer, the term of this patent is extended or adjusted under 35 U.S.C. 154(b) by 173 days.

(21) Appl. No.: 18/478,107

(22) Filed: Sep. 29, 2023

(51) Int. Cl.
*H04L 9/40* (2022.01)

(52) U.S. Cl.
CPC ...... *H04L 63/1433* (2013.01); *H04L 63/1416* (2013.01); *H04L 63/1425* (2013.01)

(58) Field of Classification Search
CPC ............ H04L 63/1433; H04L 63/1416; H04L 63/1425
USPC .................................................. 726/22–25
See application file for complete search history.

(56) References Cited

U.S. PATENT DOCUMENTS

| 7,739,211 | B2 * | 6/2010 | Coffman | ............... | H04L 63/145 |
| | | | | | 706/45 |
| 10,091,229 | B2 * | 10/2018 | Stute | ................... | H04L 63/1433 |
| 11,743,282 | B1 | 8/2023 | Torkamani et al. | | |
| 11,886,586 | B1 * | 1/2024 | Chang | .................. | G06F 21/566 |
| 2016/0065597 | A1 * | 3/2016 | Nguyen | ............. | H04L 63/1441 |
| | | | | | 726/22 |
| 2017/0063912 | A1 * | 3/2017 | Muddu | ................ | G06F 3/0482 |
| 2017/0310693 | A1 * | 10/2017 | Howard | ............... | H04L 63/166 |
| 2019/0028508 | A1 * | 1/2019 | Jeng | ........................ | H04L 43/16 |
| 2021/0314349 | A1 * | 10/2021 | Liu | ........................ | G06N 20/00 |
| 2021/0326744 | A1 * | 10/2021 | Israel | ..................... | G06N 5/02 |
| 2022/0172050 | A1 * | 6/2022 | Dalli | ...................... | G06N 3/047 |
| 2022/0391663 | A1 * | 12/2022 | Zhang | ..................... | G06N 3/04 |
| 2023/0199026 | A1 * | 6/2023 | Venzin | .................. | G06N 3/088 |
| | | | | | 726/22 |

(Continued)

OTHER PUBLICATIONS

Kaize Ding et al.; Cross-Domain Graph Anomaly Detection; IEEE Transactions On Neural Networks and Learning Systems, vol. 33, No. 6, Jun. 2022; 2022 (Year: 2022).*

(Continued)

*Primary Examiner* — Kambiz Zand
*Assistant Examiner* — Mahabub S Ahmed
(74) *Attorney, Agent, or Firm* — Atborus, PLLC (57) ABSTRACT

Disclosed are systems and methods that monitor for malicious and unauthorized behaviors, determine categories for detected malicious behaviors, determine why a domain is determined to be malicious, and provide information to users that identifies the categories and reasons as to why a domain is determined to be malicious. In some implementations, the disclosed systems and methods may be utilized to provide monitoring security to customers of a cloud service. For example, customers of a cloud service may maintain an account with the cloud service and the disclosed implementations may be utilized to protect those accounts from malicious attacks and cybercrimes such as, but not limited to, spam, phishing, malware, botnets, etc.

20 Claims, 8 Drawing Sheets

(56) References Cited

U.S. PATENT DOCUMENTS

| | | | |
|---|---|---|---|
| 2023/0222208 A1* | 7/2023 | Razi | G06N 3/088 726/23 |
| 2023/0300161 A1* | 9/2023 | Jenks | H04L 63/1433 |
| 2023/0353587 A1* | 11/2023 | Bui | H04L 63/1416 |
| 2023/0362175 A1* | 11/2023 | Li | H04L 41/16 |
| 2023/0421578 A1* | 12/2023 | Mullins | H04L 63/1416 |
| 2024/0211596 A1* | 6/2024 | Livne | G06N 3/08 |
| 2024/0333747 A1* | 10/2024 | Parla | G06F 21/31 |
| 2024/0333749 A1* | 10/2024 | Nabeel | H04L 63/1433 |
| 2024/0403428 A1* | 12/2024 | Lal | G06F 21/566 |
| 2025/0097242 A1* | 3/2025 | Zhao | H04L 63/102 |

OTHER PUBLICATIONS

Wenxuan He, et al.; Malicious Domain Detection via Domain Relationship and Graph Models; IEEE Xplore; 2025 (Year: 2019).*

Shuai Zhang et al.; Attributed Heterogeneous Graph Neural Network for Malicious Domain Detection; Proceedings of the 2021 IEEE 24th International Conference on Computer Supported Cooperative Work in Design; 2021 (Year: 2021).*

Yonghong Huang1 et al.; Graph neural networks and cross-protocol analysis for detecting malicious IP addresses.; Springer; 2023 (Year: 2023).*

Alexa Internet, Inc. Top sites, 2021. www.alexa.com., Alexa Internet, Inc. Copyright 1996-2021. URL: https://web.archive.org/web/20210811170942/https://www.alexa.com/topsites, (downloaded Aug. 11, 2021, by web.archive.org).

Chen, X., M. Chen, W. Shi, Y. Sun, and C. Zaniolo. Embedding uncertain knowledge graphs. In Proceedings of the AAAI Conference on Artificial Intelligence, vol. 33, No. 1, pp. 3363-3370,2019.

CROWDSTRIKE. Falcon X: Automated Threat Intelligence, 2021. URL: https://web.archive.org/web/20210811202433/https://www.crowdstrike.com/endpoint-security-products/falcon-x-threat-intelligence/ (downloaded Aug. 11, 2021, by web.archive.org).

DOMCOP. Top 10 Million Domains, 2021. URL: https://web.archive.org/web/20210813211408/https://www.domcop.com/top-10-million-domains(downloaded Aug. 13, 2021, by web.archive.org).

Eckart, C., & Young, G. (1936). The approximation of one matrix by another of lower rank. Psychometrika, 1(3), 211-218.

Hubbard, Dan. Cisco Umbrella: Top 1 million, Dec. 14, 2016, Updated Mar. 31, 2021, URL: https://web.archive.org/web/20210802174758/https://umbrella.cisco.com/blog/cisco-umbrella-1-million (downloaded Aug. 2, 2021, by web.archive.org).

MAJESTIC. The Majestic Million, 2021. URL: https://web.archive.org/web/20210811005852/https://majestic.com/reports/majestic-million (downloaded Aug. 11, 2021, by web.archive.org).

Perozzi, B., Al-Rfou, R. and Skiena, S. 2014. Deepwalk: Online Learning of Social Representations. In KDD. http://perozzi.net/publications/14_kdd_deepwalk.pdf.

PROOFPOINT. Emerging Threats Intelligence, 2021. URL: https://www.proofpoint.com/us/products/et-intelligence (downloaded Aug. 11, 2021, by web.archive.org).

Sato, R., Yamada, M., & Kashima, H. (2021). Random features strengthen graph neural networks. In Proceedings of the 2021 SIAM international conference on data mining (SDM) (pp. 333-341). Society for Industrial and Applied Mathematics.

Torkamani, A., B. Coskun, and B. Jeffrey. Scoring domain names at scale using k-partite graph convolution and embedding. 8th Amazon Machine Learning Conference (AMLC), 2020.

Tsoumakas, Grigorios, and Ioannis Katakis. "Multi-label classification: An overview." International Journal of Data Warehousing and Mining (IJDWM) 3, No. 3 (2007): 1-13.

Wu, Felix, Amauri Souza, Tianyi Zhang, Christopher Fifty, Tao Yu, and Kilian Weinberger. "Simplifying graph convolutional networks." In International conference on machine learning, pp. 6861-6871. PMLR, 2019.

* cited by examiner

DETECTION OF MALICIOUS DOMAINS

BACKGROUND

Domain Name System ("DNS") is a mapping system in which Internet domain names are mapped to Internet Protocol ("IP") addresses. Domains are one of the major attack vectors used in various cybercrime, such as spam, phishing, malware, botnets, etc. Therefore, it is essential to effectively detect and block malicious domains when combating cyber attackers.

Traditional systems that attempt to detect and block malicious domains typically follow a feature based approach. While these techniques provide good performance, potential problems still exist. First, in the training phase, these traditional systems require labeled datasets large enough to ensure accuracy and coverage. However, the fickle nature of DNS makes accurate labeling an arduous process. Second, traditional systems treat each domain individually and rely on some manually selected statistical features (e.g., number of distinct IP addresses, the standard deviation of Time to Live ("TTL"), etc.), making evasion of the detection system by attackers possible.

DETAILED DESCRIPTION

Disclosed are systems and methods that monitor for malicious and unauthorized behaviors, determine categories for detected malicious behaviors, determine why a domain is determined to be malicious, and provide information to users that identifies the categories and reasons as to why a domain is determined to be malicious. In some implementations, the disclosed systems and methods may be utilized to provide monitoring security to customers of a cloud service. For example, customers of a cloud service may maintain an account with the cloud service and the disclosed implementations may be utilized to protect those accounts and compute instances ("CI") generated through those accounts, from malicious attacks and cybercrimes such as, but not limited to, spam, phishing, malware, botnets, etc.

The monitoring service, as discussed herein, may maintain a list of malicious domains, which may be determined from the monitoring service itself and/or obtained from other threat intelligence ("TI") services (e.g., ADMIN-USLabs, CRDF, Kaspersky, AlienVault, etc.) in the form of threat lists. However, threat lists received from other TI services may include false positives, which could lead to adverse operational consequences for customers of the cloud service, such as blocking of legitimate domains. Additionally, in some implementations, information about a domain received from a first TI service may conflict with information received from a second TI service. For example, a popular domain could be abused and appear malicious to some TI services. As a result, a first TI list received from a first TI service may identify the domain as benign while a second TI list from a second TI service may identify the domain as malicious. Accordingly, the disclosed implementations normalize threat lists received from TI services, improve the accuracy in determining malicious domains, and provide information to users as to why a domain was determined to be malicious, and optionally provide an identification of a determined classification for the malicious domain. Continuing with the above example of conflicting information about a domain and/or instances in which TI services use different descriptors/categories for domains, as discussed herein, the disclosed implementations may normalize received information into a normalized schema for the domains that allows the information from each TI service to co-exist in the representations generated for the domains.

As discussed further below, the disclosed implementations generate a large-scale heterogenous graph of interactions between monitored compute instances, domains, Internet Protocol ("IP") addresses, account identifiers ("ID") for accounts that use a compute service to generate CIs, Canonical Name Records ("CNAME"), etc., and their diverse relationships. For example, the DNS scene may be mapped into an M-partite graph that includes multiple nodes and edges. Nodes may represent, for example, CIs, domains, IP addresses, account ID of accounts of the monitoring service, etc. Rather than rely on manually selected statistical features, as is traditionally done, in accordance with the disclosed implementations, useful information from labeled domains may be extracted by building a knowledge graph over the subcategories of domain labels. The knowledge graph will generate embeddings for all the subcategories of domains, which can be used as initial embeddings in the M-partite graph. Likewise, the knowledge graph may be further supplemented with embeddings for each of a plurality of known benign domains. Still further, message passing between different nodes of the M-partite graph helps propagate knowledge of the graph among nodes and generate meaningful embeddings for nodes corresponding to domains in which it is unknown as to whether the domain is malicious or benign.

Figure 1:
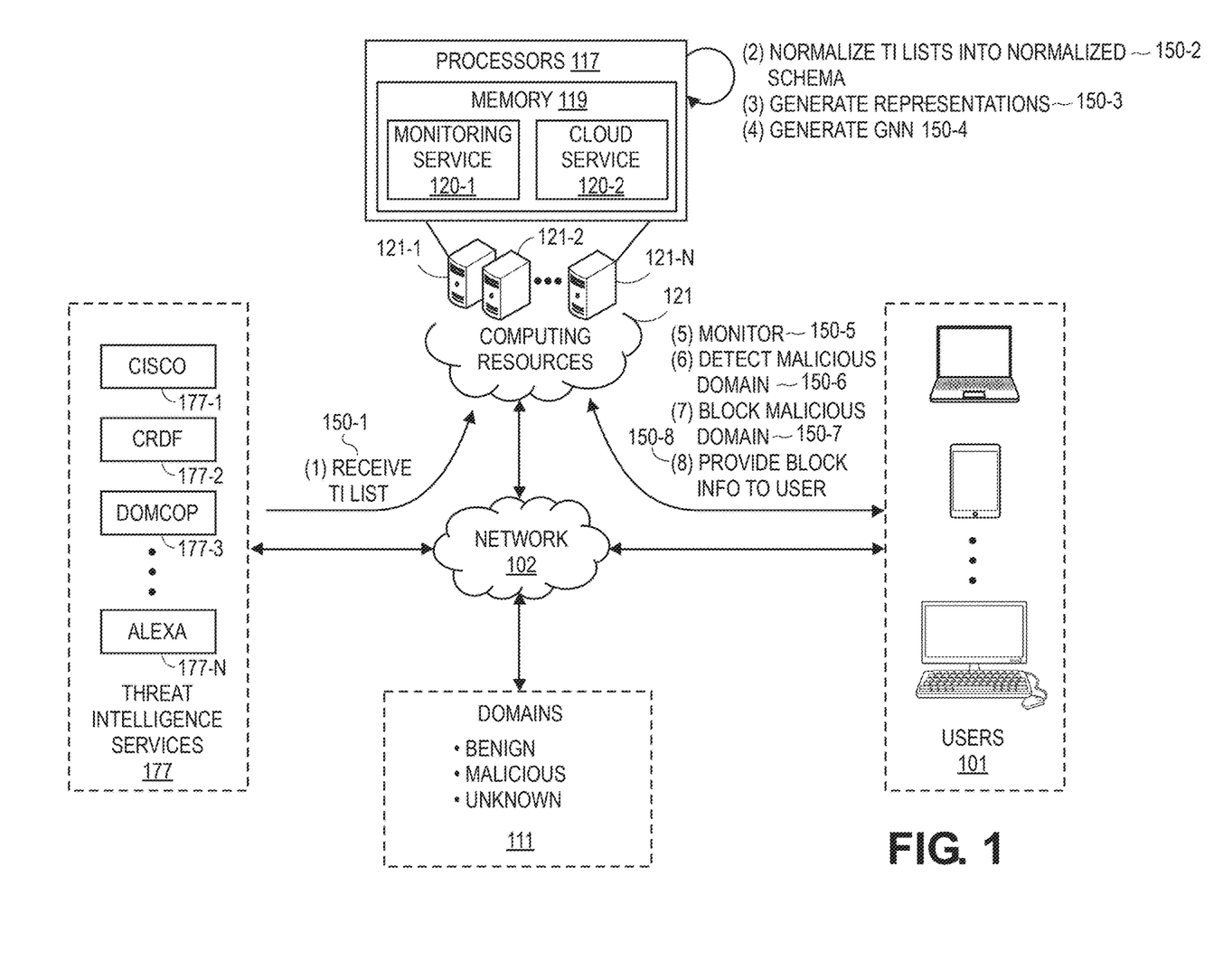
FIG. 1 is a transition diagram illustrating the training and use of a graph neural network ("GNN") in which the GNN is trained to monitor for malicious domains and, upon detection of a malicious domain, provide protection to users of a cloud service, classify the malicious domain, and provide information to the users of the cloud service that indicates why the domain is determined to be malicious, in accordance with disclosed implementations.

FIG. 1 is a transition diagram illustrating the training and use of a graph neural network ("GNN"), or other machine learning model, in which the GNN is trained to monitor for malicious domains and, upon detection of a malicious domain, provide protection to users of a cloud service, classify the malicious domain, and provide information to the users of the cloud service that indicates why the domain is determined to be malicious, in accordance with disclosed implementations.

The monitoring service 120-1, which may be executing on one or more computing resources 121, may receive threat intelligence ("TI") information 150-1 from one or more TI services 177. As is known, there are multiple TI services 177 such as CISCO 177-1, CRDF 177-2, DOMCOP 177-3 through ALEXA 177-M. Each of these TI services 177 may monitor domains to generate TI lists that include indications as to whether a domain is determined to be benign or malicious. Many of these TI services also include categories or other information in the TI lists for domains determined to be malicious. However, TI lists received from the various TI services 177 are often inconsistent and/or conflicting. Likewise, there is no consistency for designation of categories or other information included in TI lists when describing malicious domains. For example, a first TI service 177-1 may provide a single "category code" whereas a second TI service 177-2 may provide multiple categories or descriptions for a determined malicious domain that have little or no relation to the category codes used by the first TI service. Likewise, in some instances, different TI services may provide conflicting categorizations of a domain. For example, a popular domain could be abused and appear malicious to some TI services but not others. As a result, a first TI list received from a first TI service may identify the domain as benign while a second TI list from a second TI service may identify the domain as malicious.

The monitoring service 120-1, upon receiving TI lists from one or more TI services 177, such as a first TI service 177-1, a second TI service 177-2, a third TI service 177-3, through an M-th TI service 177-M, may transform the different received TI lists into a consolidated and normalized schema 150-2. In some examples, the various threat lists received from the different TI services 177 may be mapped into defined tactics and attributes maintained by the monitoring service, thereby normalizing the inconsistent use of information/categories utilized to describe domains that are determined to be malicious while at the same time retaining the information received from the different TI services regarding those domains. Tactics may include, for example and not by way of limitation, initialAccess, exfiltration, reconnaissance, resourceDevelopment, impact, commandAndControl, etc. Attributes may include, for example and not by way of limitation, technique/typoSquatting, characteristics/actorControlled, intent/phishing, intent/exploitDelivery, intent/malwareDelivery, etc. Any number and/or type of tactics and/or attributes may be defined and maintained by the monitoring service. Still further, in some implementations, the monitoring service may maintain or define malware classifiers into which malware domains are classified. Malware classifiers may include, by way of example and not limitation, PittyDownloaderA, ChattyCRC, msger, Emdivi, HtDnDownLoader, POWERTON, Scanbox, etc.

Other information that may be received and/or maintained by the monitoring service for domains may include ranking categories for domains (e.g., top20k/alexa, top100k/alexa, top1m/alexa, top500k/cisco, etc.) which may rank domains based on popularity/frequency of access.

As part of normalization, the confidence values for each Indicator of Compromise ("IoC") received from the various TI services 177 for each domain may be normalized to a defined scale, such as −100 (malicious) to 100 (benign). Still further, in some examples, a set of rules may be applied to assign higher or lower confidence values to certain threat types. For example, threat types relating to Crypto may be assigned a higher threat value than other threat types.

Once the different content of the different TI lists received from the different TI services 177 has been consolidated and normalized into a normalized schema, the monitoring service 120-1 may generate pretrained representations for each possible normalized label type (tactics, attributes, ranking, etc.). As discussed herein, the pretrained representations are additive, therefore by adding two or more of them together, all information relating to the representations is retained and may be utilized as labels for the representation.

A graph that includes nodes and edges of the DNS scene may also be generated. As discussed further below, in some implementations, nodes may be defined by CI, domain, IP address, account identifier of accounts of the monitoring service, etc. Edges may be defined as the interconnections between domains and CI that are monitored by the monitoring service, interconnections between the domain and IP address, interconnections between the domain and the corresponding second level domain and top-level domain ("TLD") pairs, interconnections between the domain and CNAME record, interconnections between the domain and account Id of the account that maintains the CI, etc. As discussed further below, a variety of techniques may be used to define the graph, the positioning of the nodes, and the corresponding edges.

The pretrained representations of each possible label may be utilized to generate initial representations (e.g., distributed vector representations), also referred to herein as initial embeddings, for each node of the graph (both benign domains and malicious domains), as in 150-3. As discussed further below, there are a variety of techniques that may be utilized to generate the initial embeddings for nodes of the graph.

The graph of known nodes and edges may then be used to train a GNN and classifier to predict whether a node is benign or malicious, and determine the tactics and attributes of the node if the node is determined to be malicious, as in 150-4. For example, as discussed further below, message passing techniques, which update the state of each node based on information received from neighbor nodes, may be used to tune and scale the GNN for use on a large graph, such as a graph of the DNS scene that has billions of nodes and trillions of edges. In some implementations, the GNN may have two layers such that message passing goes two steps into the graph. In other implementations, the GNN may have fewer or additional layers and there are fewer or additional levels of message passing.

The last stage of the GNN, after message passing, may be a classifier, such as a multi-labeled classifier, that is trained to process the final embeddings generated by the GNN to determine if the domain represented by the final embedding is malicious or benign and/or to classify the domain if the domain is determined to be malicious (e.g., assign the domain to a defined classification, assign tactics, attributes, etc.). The classifier may be any of a variety of classifiers. For example, the classifier may be a Binary Relevance classifier, Neural Network classifier, a Random Forest classifier, etc.

By using pretrained representations of labels that are included in the embeddings of each node that is known to correspond to a benign or malicious domain, further training of the middle layers of the GNN is not required, thereby reducing the computing time and complexity needed to train the GNN. For example, the pretrained representations may be propagated as nodes' seed features via a message passing process between layers of the GNN. Message passing results in concise context representation in the neighborhood of a domain in the graph that helps explain the rationale behind each prediction as well as enabling the monitoring service to predict specific tactics and attributes associated with each domain name or IP address. This structure also increases the accuracy of detection performance in determining if an unknown domain is malicious or benign.

In some implementations, the GNN may be configured to process embeddings of the graph periodically (e.g., hourly, daily, weekly) and update the determinations for domains represented in the graph. As will be appreciated, the entire DNS scene may be processed as domains may change from benign to malicious and/or from malicious to benign and new domains may be added to the DNS scene. In other implementations, only portions of the DNS scene may be periodically processed, only newly identified domains may be processed, such as in real time or near real time, segments of the DNS scene may be processed on a rolling basis, etc.

Regardless of frequency, the disclosed implementations may be used to monitor 150-5 and determine the state (malicious or benign) of existing domains and/or newly identified or unknown domains 111 accessed by compute instances hosted by the cloud service 120-2 for different users 101 of the cloud service. If a domain 111 that is unknown to the monitoring service 120-1 is accessed by a compute instance of a user 101, the monitoring service may process the unknown domain 111 with the GNN to determine whether the domain is benign or malicious, as in 150-6. For example, the unknown domain may be represented as a node in the graph, the graph, or a portion thereof, processed by the GNN to generate an embedding for the unknown domain (e.g., through message passing/propagation). The generated embedding for the unknown domain may then be analyzed to determine if the domain is benign or malicious. The GNN may also identify the tactics, attributes, classification, etc. of domains determined to be malicious.

If the domain is malicious, the monitoring service 120-1, at 150-7, may take action on behalf of the user 101 and block access with the domain. Likewise, because the GNN is able to provide context about the domain (e.g., tactics, attributes, classification), at 150-8 the monitoring service 120-1 may provide such information to the user 101 so the user has insight as to why the domain request was blocked and the domain identified as malicious.

The system may also include computing resource(s) 121. The computing resource(s) 121 may be remote from users 101 and/or TI services 177. Likewise, the computing resource(s) 121 may be configured to communicate over a network 102 with the TI services 177, users 101 and/or domains 111.

As illustrated, the computing resource(s) 121 may be implemented as one or more servers 121(1), 121(2), . . . , 121(N) and may, in some instances, form a portion of a network-accessible computing platform implemented as a computing infrastructure of processors, storage, software, data access, and so forth that is maintained and accessible by components/devices of the system via a network 102, such as an intranet (e.g., local area network), the Internet, etc. The computing resources 121 may host one or more of the monitoring service 120-1 and/or the cloud service 120-2, execute a GNN, etc., as discussed herein.

The server system(s) 121 does not require end-user knowledge of the physical location and configuration of the system that delivers the services. Common expressions associated for these remote computing resource(s) 121 include "on-demand computing," "software as a service (SaaS)," "platform computing," "network-accessible platform," "cloud services," "data centers," and so forth. Each of the servers 121(1)-(N) include a processor 117 and memory 119, which may store or otherwise have access to a monitoring service 120-1 and/or the cloud service 120-2, as described herein. An example server is discussed further below with respect to FIG. 8.

The network 102, and each of the other networks discussed herein, may utilize wired technologies (e.g., wires, USB, fiber optic cable, etc.), wireless technologies (e.g., radio frequency, infrared, NFC, cellular, satellite, Bluetooth, etc.), or other connection technologies. The network 102 is representative of any type of communication network, including data and/or voice network, and may be implemented using wired infrastructure (e.g., cable, CAT6, fiberoptic cable, etc.), a wireless infrastructure (e.g., RF, cellular, microwave, satellite, Bluetooth, etc.), and/or other connection technologies.

Figure 2:
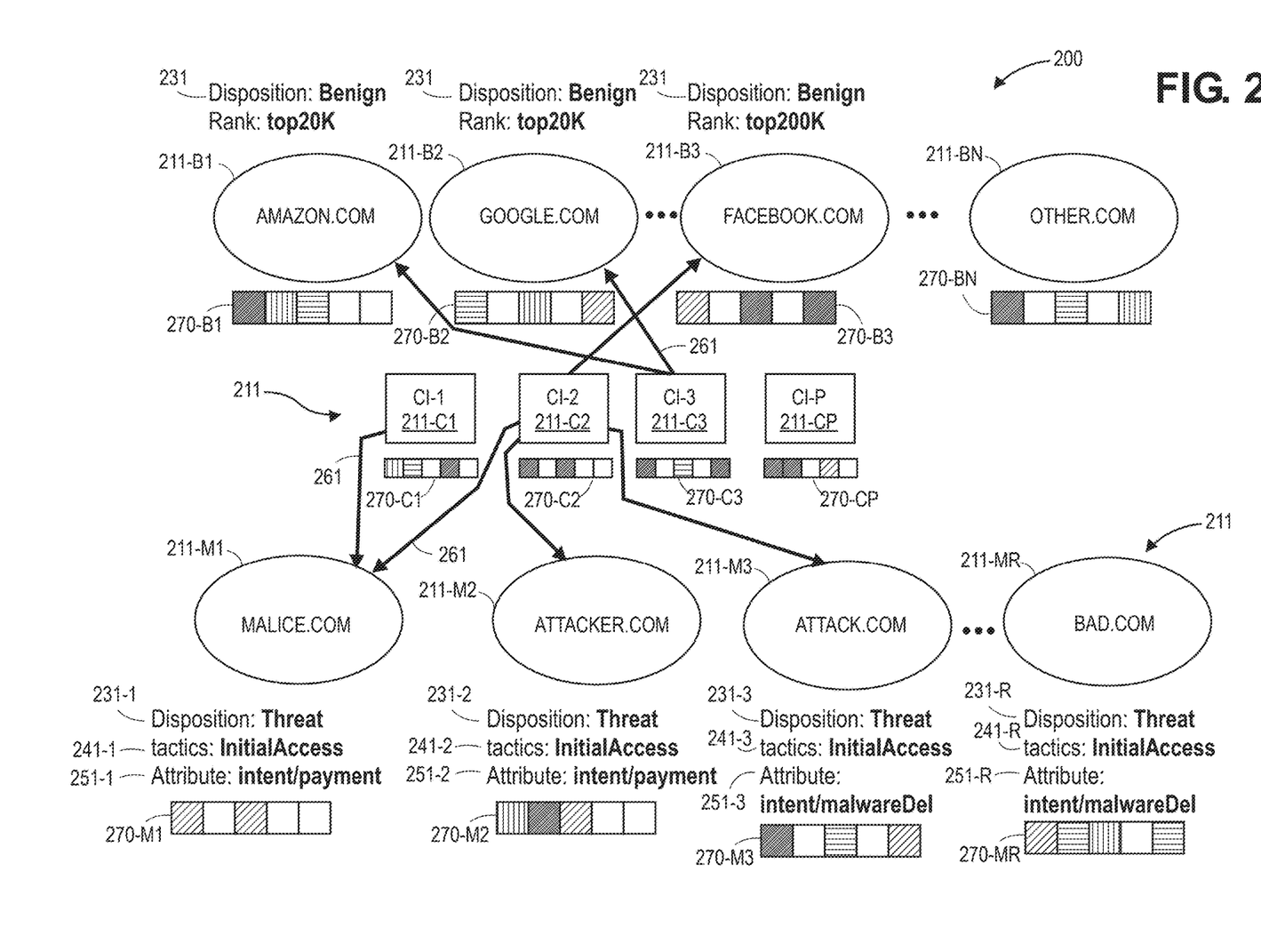
FIG. 2 is an illustration of both known benign domains and known malicious domains, along with interconnection indications between the domains and compute instances that are monitored by the monitoring service, in accordance with disclosed implementations.

FIG. 2 is an illustration of both known benign domains and known malicious domains, along with interconnection indications between the domains and compute instances that are monitored by the monitoring service, in accordance with disclosed implementations.

As illustrated in FIG. 2, domains 211, both known benign domains 211-B1, 211-B2, 211-B3, through 211-BN and known malicious domains 211-M1, 211-M2, 211-M3, through 211-MR, along with tactics, attributes, rankings, classifications, etc., associated with those domains, may be used as part of generating training data for training a GNN, or other machine learning model. For example, some very highly ranked domains, such as amazon.com 211-B1, google.com 211-B2, facebook.com 211-B3 through other- .com 201-BN may be well known and highly accessed domains that, from monitoring, ranking, common knowledge, etc., are known to be benign domains 211 (i.e., not malicious). Such well known domains 211 may have a disposition 231 of benign associated with the domain that is maintained by the monitoring service. In some implementations, rankings assigned to those domains 211 may also be maintained and included in the representations of those domains.

Likewise, there are other domains, such as malice.com 211-M1, attacker.com 211-M2, attack.com 211-M3, through bad.com 211-MR that are well known and established to be malicious domains 211. For each of the known malicious domains 211-M1 through 211-MR the monitoring service may maintain a disposition 231 of threat (or other indicator that the domain is malicious), along with determined tactics 241 and/or attributes 251 for each domain. As discussed above, tactics and attributes may be normalized based on categories or other classifiers assigned to the domains by other TI services and/or by the management service.

In the illustrated example, the malicious domain 211-M1 of malice.com has a disposition 231-1 of Threat, a tactics 241-1 of initialAccess and an attribute of 251-1 of intent/ payment. The malicious domain 211-M2 of attacker.com has a disposition 231-2 of Threat, a tactics 241-2 of initialAccess and an attribute of 251-2 of intent/payment. The malicious domain 211-M3 of attack.com has a disposition 231-3 of Threat, a tactics 241-3 of initialAccess and an attribute of 251-3 of intent/malwareDel. The malicious domain 211-MR of bad.com has a disposition 231-R of Threat, a tactics 241-R of initialAccess and an attribute of 251-R of intent/ malwareDel.

As discussed herein, because the graph includes both benign domains and malicious domains, which are therefore incorporated and used with a GNN, the traditional need for manually assigned weights to combine lists of benign domains and malicious domains or requiring assumptions about the validity of lists (or the corresponding domains) is eliminated. This benefit provides a technical improvement over existing systems and eliminates the need for manually designed and handcrafted features.

In addition to domains 211 and information about those domains, such as tactics 241 and/or attributes 251, edges 261 may be established that indicate access requests between nodes and CIs such as CI-1 211-C1, CI-2 211-C2, CI-3 211-C3, through CI-P 211-CP.

In accordance with the disclosed implementations, data extracted from DNS records regarding known benign domains and known malicious domains, along with information known about CIs and accounts for those CIs, and interconnections therebetween, may be used to generate a knowledge graph. For example, in some implementations, a knowledge graph 200 may be established in which nodes are defined as:

- CI: identifier for a compute instance that was observed querying a domain,
- full domain: Tuple of (subdomain, second-level domain, top-level domain ("TLD")),
- second-level domain and TLD pair: Tuple of (second-level domain, TLD),
- IP address: IPv4, IPv6 address to which a domain resolves,
- CNAME, and
- account identifier ("ID"): the account ID of the cloud service that owns or generated the CI, and accounts.

Likewise, edges 261 between nodes 211 of the graph may be defined as:

- (full domain, CI): There is an edge between the CI ID and the full domain queried by that instance,
- (Full domain, IP): There is an edge between the full domain and IP if the full domain is resolved to that IP address,
- (Full domain, Second-Level Domain, and TLD): There is an edge between every full domain and its (second-level domain, TLD) pair,
- (Full domain, CNAME): There is an edge between the full domain and the CNAME record, and
- (Full domain, account): There is an edge between the full domain and the account ID.

As an example illustration, the DNS scene may be formulated as an attributed graph denoted by G=(V, E), where V={$v_1, \ldots, v_N$} is the set of N nodes in graph G, and E is the set of edges. More specifically, by extracting the information from the DNS data, nodes and edges of the graph may be defined and utilized to generate an M-partite graph. In the discussed example, M=6. In other implementations the number of nodes, and thus the corresponding number M for the M-partite graph may be higher or lower. $A \in \mathbb{R}^{N \times N}$ may be denoted as the corresponding adjacency matrix whose element $A_{UV} \in \{0,1\}$ indicates the existence of edge $e_{UV}$ that connects nodes U and V. X={$x_1, \ldots, x_N$} with $x_i \in \mathbb{R}^d$ may also be denoted as the d-dimensional node feature for node $v \in V$. Each node may also be associated with a set of C labels {$y_1, y_2, \ldots, y_C$} with $y_i \in \{0,1\}$.

As will be appreciated, not all nodes established from a DNS scene are known and therefore may not have corresponding labels, such as those discussed above with respect to the malicious domains. Accordingly, labeled nodes, such as the known benign domains and the known malicious domains, and the data corresponding thereto, may be denoted as $V_L$, where the corresponding labels are denoted as $Y_L = \{y_V\}_{V \in V_L}$. Comparatively, the set of unlabeled nodes may be defined as $V_U := V \backslash V_L$. In the illustrated example, semi-supervised multi-label node classification may then be utilized. For example, given A, X and the label information of the $V_L$, the goal may be to infer the label of nodes in $V_U$ by learning a classification function $f$ with parameter θ. The overall problem may then be formulated as:

$$\min_{\theta \in \mathbb{R}^d} \hat{f}(\theta) = L(f(A, X; \theta), Y_L) = \sum_{v_i \in V_L} L(f(A, x_i; \theta), \{y_i\}) \quad (1)$$

where $f(A, x_i; \theta)$ and $y_i$ are the predicted and the true labels of node $v_i$, and L(•,•) stands for a loss function (e.g., Multi-label soft margin function loss). A GNN may then be trained to solve the problem. While the below discussion focuses on using a GNN to solve the problem, in other implementations, other forms of machine learning models may be utilized.

GNNs learn compact, low-dimensional representations (embeddings) for nodes such that representation captures the nodes local network neighbor as well as the nodes features. Formally, the k-th layer of a GNN obeys the following propagation rule to aggregate the neighboring features:

$$h_i^{(k)} = g^{(k)}(\{W^{(k-1)}\}h_j^{(k-1)}\tilde{A}_{ij}, \forall j \in N_i), \forall i \in [N]$$

where $h_i^{(k)}$ denotes the feature vector of node i at layer k, $h_i^{(0)} = x_i$ is the input feature for node i, $g^{(k)}$ denotes a composite mapping function (e.g., an activation function), and $W^{(k-1)}$ is a trainable weight matrix at (k−1)-th layer. $\tilde{A}$ denotes a linear mapping of the adjacency matrix A with some sparsity pattern, and $\tilde{A}_{ij}$ is the (i,j)-th entry of $\tilde{A}$. $N_i$ indicates immediate neighbors of node i, including the node itself ($i \in N_i$).

An example of a GNN architecture is a graph convolutional network ("GCN"), which considers learning on graph structures using convolutional operations, and works well with embeddings. In GCN, the generic propagation rule is specified as:

$$h_i^{(k)} = ReLU\left(\sum_{j \in N_i} \{W^{(k-1)}\}h_j^{(k-1)}\tilde{A}_{ij}\right)$$

where ReLU(•) is the ReLU activation function. $\tilde{A}_{ij}$ is the i-th row of $\tilde{A}$. In the illustrated example, $\tilde{A}$ is the normalized adjacency matrix $\tilde{A} = \hat{D}^{-1/2}\hat{A}\hat{D}^{-1/2}$ with $\hat{A} = A + I$, and $\hat{D}_{ij} = 0$ if i=j $\hat{D}_{ij} = 1^T A_{:,i}$. Based on the above, the standard form of a GCN can be represented as:

$$H^{(k)} = ReLU(\tilde{A}H^{(k-1)}(W^{(k-1)})^T)$$

where $$H^{(k)} = [(h_1^{(k)})^T; \ldots ; (h_N^{(k)})^T].$$

After obtaining the final feature representation from the output of the K-th layer, the forward model $f(A,X;\theta)$ with θ={W} in equation (1) above, the problem can be represented as:

$$f(A,X;\theta) = SoftMax(\tilde{A}H^{(K)}W^{(K)}),$$

Wherein softmax(•) is the SoftMax function.

Because typical GNNs cannot scale to extremely large graphs, such as a DNS graph with billions of nodes and trillions of edges, instead of learning a (K−1)-layers model, the above discussed convolutional methods are simplified into semi-supervised message passing procedures, and then the classification model (i.e., K-layer) is learned based on the output of the message passing. The simplified graph neural network may include two stages: feature propagation in each relation and final model predictions (multi-label classification in our case). Feature propagation aggregates messages received from neighboring nodes in each relation and uses this information to iteratively update the nodes own representation. For example, given a node i, its vector representation $h_i^{(k)}$ at layer k, and its neighborhood $N_m(i)$ over m-th relation, a message passing update can be written as:

$$h_i^{(k)} = \frac{1}{M} h_i^{(k-1)} + \sum_{m=1}^{M-1} \frac{1}{|N_m(i)|} \sum_{j \in N_m(i)} h_j^{(k-1)}.$$

As illustrated, an embedding may be generated for each labeled node. For example, the benign domains, represented as nodes 211-B1, 211-B2, 211-B3, through 211-BN may be represented as embeddings 270-B1, 270-B2, 270-B3, through 270-BN, respectively. CIs, represented as nodes 211-C1, 211-C2, 211-C3, through 211-CP, may be represented as embeddings 270-C1, 270-C2, 270-C3, through 270-CP. The benign domains, represented as nodes 211-M1, 211-M2, 211-M3, through 211-MR may be represented as embeddings 270-M1, 270-M2, 270-M3, through 270-MR, respectively. As noted above, the embeddings may be formed from predefined representations for each possible label that may be used in accordance with the disclosed implementations.

Figure 3:
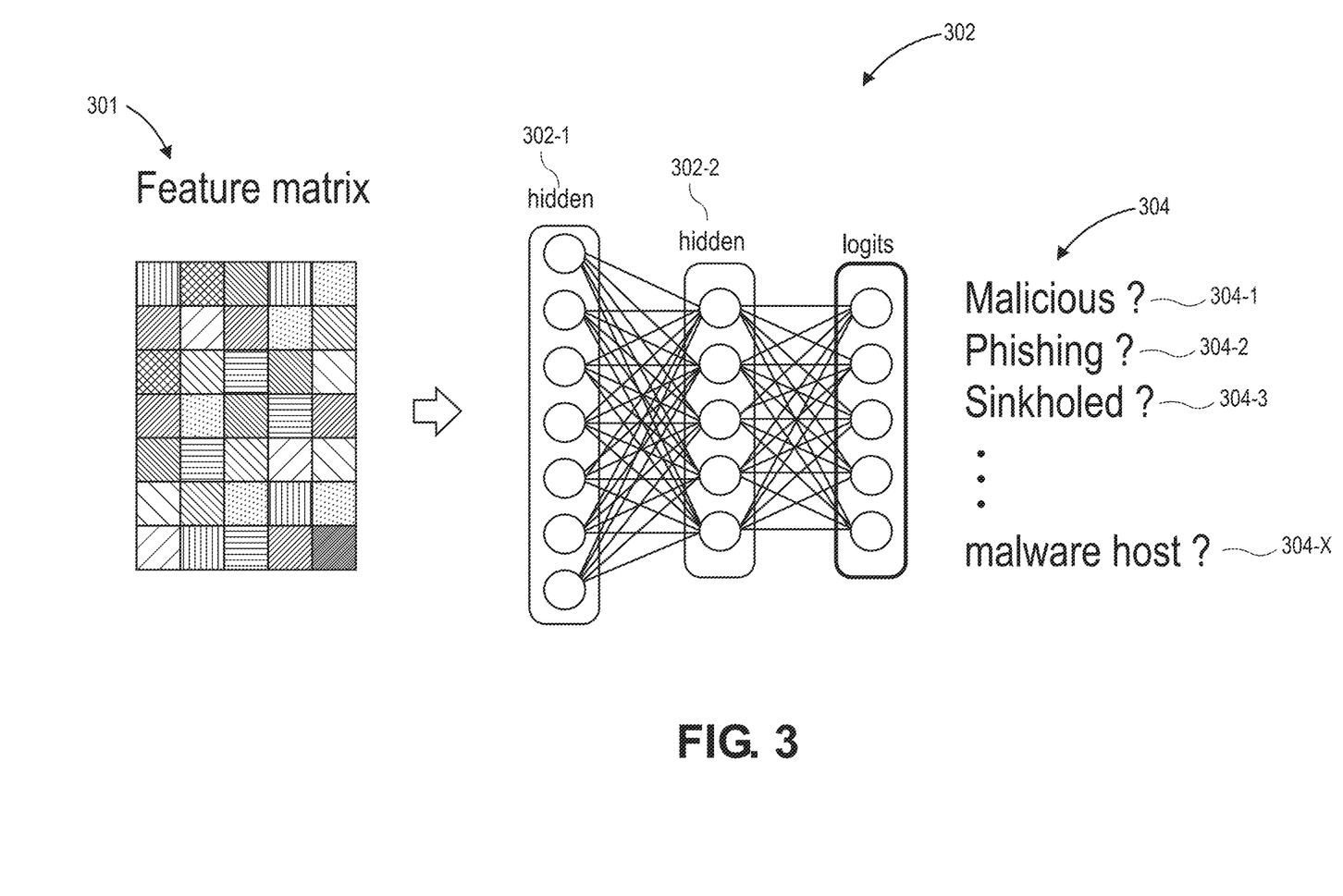
FIG. 3 is a block diagram illustrating the training of a graph neural network based on a feature matrix generated from the embeddings discussed with respect to FIG. 2, in accordance with disclosed implementations.

Referring to FIG. 3, the final embeddings of the graph may be represented as a feature matrix 301 that is used to train a multi-label classifier 304, such as a Binary Relevance classifier, a Neural Network classifier, a Random Forest classifier, etc., which may have multiple hidden layers 302-1, 302-2, etc., to classify nodes of the graph, such as newly identified nodes into one or more categories, such as malicious 304-1, phishing 304-2, sinkholed 304-3 through malware host 304-X. Any number of classifications may be defined and used with the multi-labeled classifier to classify a domain and those provided with respect to FIG. 3 are illustrated as examples only. As discussed herein, the classifier and the information determined therefrom may be used to determine not only whether a domain is malicious or benign but also tactics, attributes, categories, etc., for a malicious domain. Such information for a malicious domain may be provided to operators to determine what actions to take with respect to the domain, may be used to cause one or more automated actions to be performed with respect to the domain (e.g., deny access with the domain), and/or to provide additional information to a user as a basis as to why a domain is determined malicious.

Figure 4:
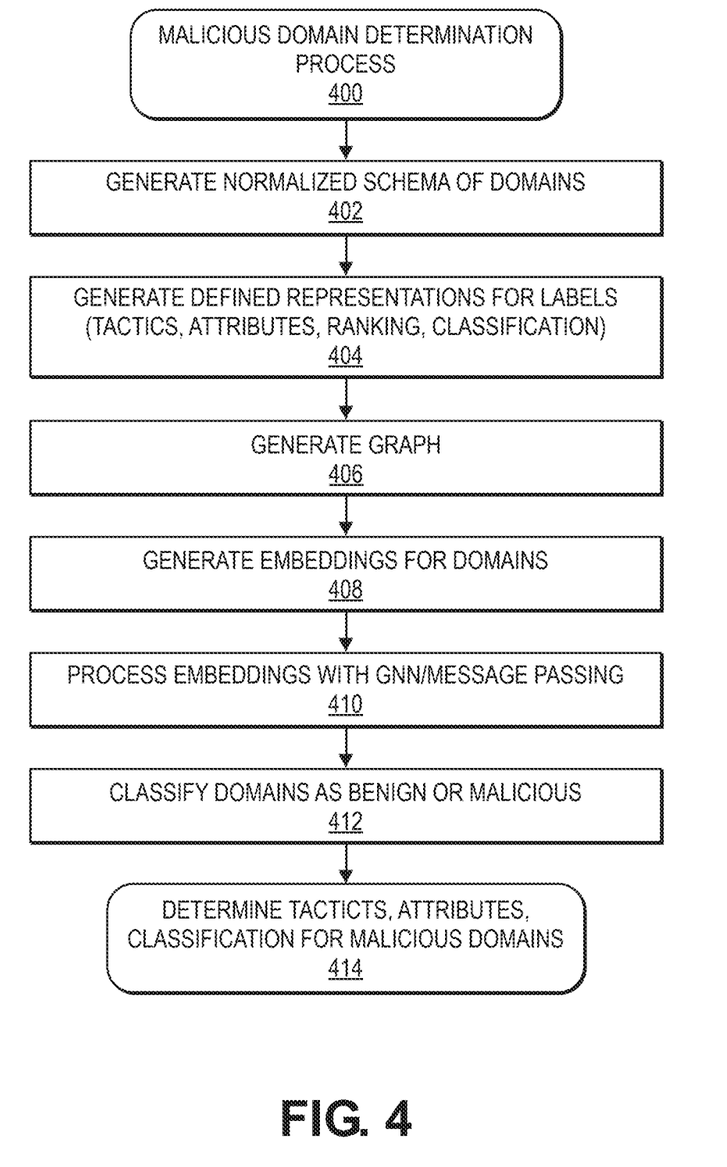
FIG. 4 is an example malicious domain determination process, in accordance with disclosed implementations.

FIG. 4 is an example malicious domain determination process 400, in accordance with disclosed implementations. The example process 400 may be performed periodically (e.g., hourly, daily, weekly) and may be performed on, for example, the entire DNS scene, segments of the DNS scene, select domains, etc. In some implementations, the example process may be performed daily on the entire DNS scene and then performed in real-time or near real-time for any newly identified domains.

The example process 400 begins by generating a normalized schema for domains that are to be processed by the example process 400, as in 402. As discussed above, in some examples, TI lists may be received from one or more TI services. In other implementations, the example process may maintain its own TI list. Regardless of the source, the normalized scheme of domains may include some domains of the DNS scene or all domains of the DNS scene. As discussed above, for domains that are known to be malicious, the normalized schema may also include labels for tactics, attributes, and/or categories for each of those malicious domains to provide context as to why the domain is determined malicious. Likewise, the tactics, attributes, and/or categories may be selected from a defined list of tactics, attributes, and/or categories. In addition, defined representations may be generated for each of the defined labels (tactics, attributes, categories), as in 404. Providing defined representations for the list of labels allow for embeddings to be updated through message passing, as discussed herein, without losing context or information about the domains.

The example process 400 may then generate a graph that includes nodes and edges, as in 406. As discussed above, the nodes of the graph may represent, for example, CIs, domains, IP addresses, account ID of accounts of the monitoring service, etc. Likewise, edges of the graph may represent, for example, interconnections between domains and CIs that are monitored by the monitoring service, interconnections between the domain and IP address, interconnections between the domain and the corresponding second level domain and TLD pairs, interconnections between the domain and CNAME record, interconnections between the domain and account ID of the account that maintains the CI, etc.

Embeddings for the domains of the graph may also be generated, as in 408. As discussed above, embeddings may be generated for domains that are known to be benign or known to be malicious based on the information known about those domains, which may include the representations for the labels associated with those domains. In comparison, for domains that are unknown, the embedding may only include the limited information known about the domain (e.g., domain name, IP address, etc.)

The embeddings of the graph may then be processed by a GNN, through the use of message passing, to update the embeddings for each node/domain of the graph based on information learned about the neighboring nodes of the graph. Message passing may be determined based on the number of layers of the GNN. For example, in some implementations, messages may be passed two layers. In other implementations, message passing may be longer or shorter. When message passing is complete, each node/domain of the graph has a final embedding that has been generated by updating the initial embedding generated for the node based on messages received from neighboring nodes.

The example process 400 may then process the final embeddings of the domains with a classifier, such as a multi-layer classifier, to determine whether the domain is benign or malicious, as in 412. Finally, as discussed herein, for domains determined to be malicious, the final embedding generated for those domains may be further processed to determine the tactics, attributes, and/or classification of the domain, as in 414. As discussed herein, because tactics, attributes, and/or classifications are labels determined from a defined set of tactics, attributes, and/or classifications, each of which have a defined representation, the labels generated through message passing retain context and can be used to determine a tactic, context, classification for a domain/node based on the final embedding generated for that domain/node.

Figure 5:
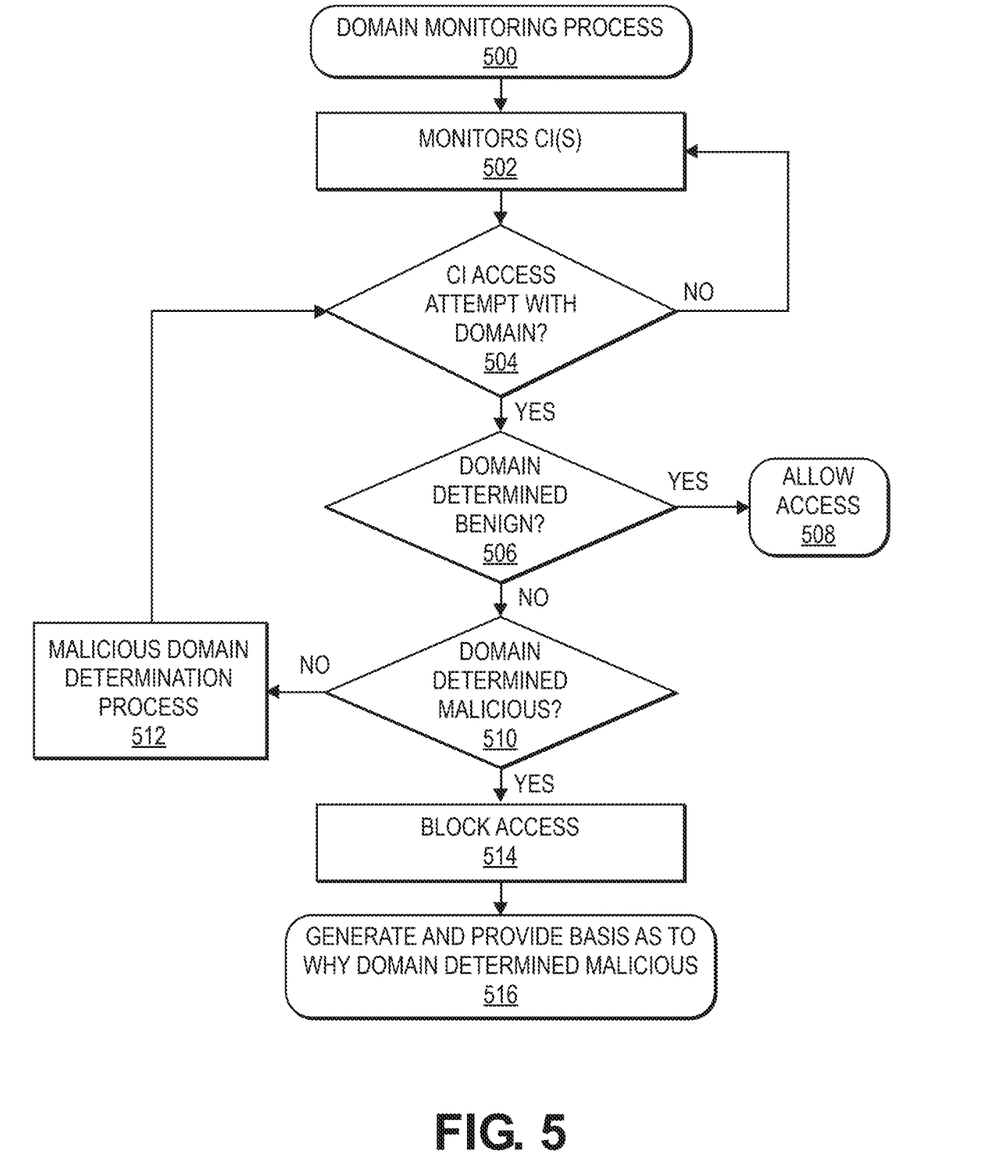
FIG. 5 is an example domain monitoring process, in accordance with disclosed implementations.

FIG. 5 is an example domain monitoring process 500, in accordance with disclosed implementations. The domain monitoring process may be periodically or continuously performed and may be used to monitor any number of CIs, as discussed herein.

The example process 500 begins by monitoring one or more CI(s), as in 502. As the example process is monitoring the one or more CI(s), a determination may be made as to whether an access between a monitored CI and a domain is attempted, as in 504. If it is determined that an access is not attempted, the example process 500 returns to block 502 and continues. If it is determined that an access is attempted, it is determined whether the domain related to the attempted access has been determined benign, as in 506. For example, and as discussed throughout, the disclosed implementations may periodically (e.g., hourly, daily, etc.) process domains to determine whether those domains are benign or malicious.

If it is determined that the domain for which the access is attempted is determined to be benign, the access is allowed, as in 508.

If it is determined that the domain is not known to be benign, it is determined whether the domain is known to be malicious, as in 510. If it is determined that the domain is not known to be malicious (i.e., the domain is unknown), the malicious domain determination process 400 (discussed above) is performed, as in 512, and the example process 500 returns to block 504 and continues. However, if it is determined that the domain is known to be malicious, the access attempt is blocked, as in 514, and a notification that includes a basis as to why the domain is determined to be malicious is generated, as in 516. As discussed above, the basis as to why a domain is determined malicious may be determined from labels included in the final embedding generated for the domain and provided as the basis as to why the domain is malicious.

As is known, embedding features help GNNs capture node distance information regarding their relative positions in a graph. For example, in the DNS graph, considering two compute instances, if the two instances have never queried a known malicious domain, it is more likely that the other unknown domains the two instances have queried are also non-malicious and their embedding features should be close to each other in the embedding graph. In comparison, if one CI has mostly queried known malicious domains and the other CI has mostly queried known malicious domains, the node features representative of those two nodes should be far from each other in the node graph.

However, because of the size of the DNS graph, which includes billions of nodes and trillions of edges, typical feature initialization methods do not perform well. For example, the one-hot method, due to the size of the DNS graph, will initialize feature vectors with extremely high dimensions, which does not scale to extremely large graphs with message passing. Similarly, the eigen and deepwalk initialization methods, which generate features by matrix decompositions, will require tremendous computation resources to perform matrix decomposition for a graph with as many nodes and edges as a DNS graph considered in the disclosed implementations.

Accordingly, the disclosed implementations may use one of the following techniques to initialize node features.

In a first example, referred to herein as label co-occurrence Graph, a graph is defined as G=(L,E), where L={$L_1$, $L_2$, ..., $L_C$} represents the set of N nodes and E represents the set of connections between any two nodes (i.e., edges), and the adjacency matrix $\tilde{A}$ is a conditional probability matrix by setting $A_{ij}$=P($L_i|L_j$), wherein P is calculated through the training set. Because P($v_i|v_j$)=P($v_j|v_1$), namely $A_{ij}$=$A_{ji}$, in some examples A can be symmetrized by $$A' = \frac{1}{2}(A + A^T).$$

Figure 6:
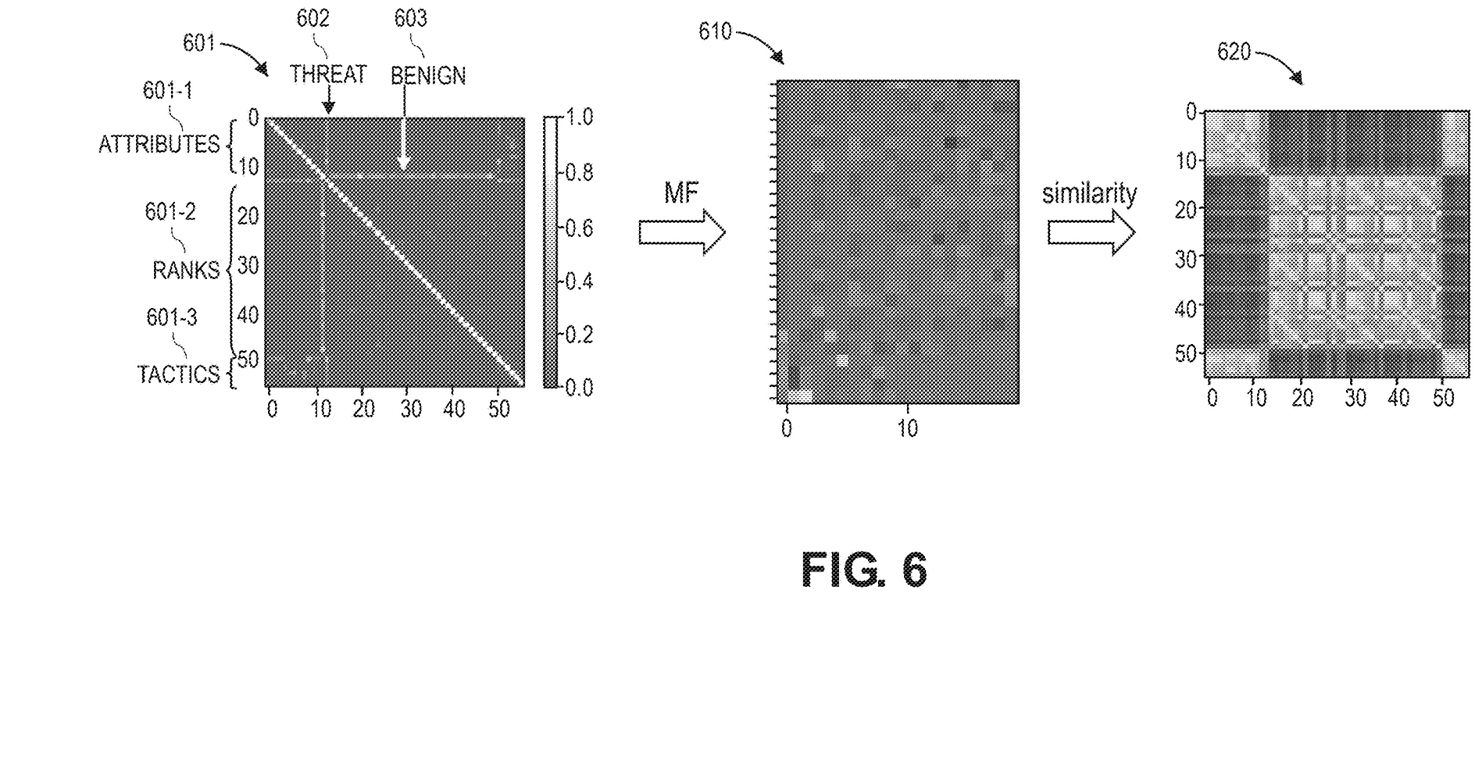
FIG. 6 is an illustration of a generation of an adjacency-based similarity graph embedding, in accordance with disclosed implementations.

For example, FIG. 6 illustrates a representation of a symmetrical adjacency matrix 601, in accordance with the disclosed implementations. As illustrated, through the adjacency matrix, the representations illustrate, for embeddings, the relationships between threat 602 identifiers and benign 603 identifiers, attributes 601-1, ranks 601-2, and tactics 601-3.

In this example, embedding vectors for labels include (a) preserving the neighborhood proximity between connected node pairs, (b) keeping the similar albeit non-adjacent nodes relatively close to each other, (c) ensuring that dissimilar and non-adjacent nodes are placed far away from each other, (d) preserving the high-order structural relationship in the embedding space, and (e) representing the graph topology.

Following the above guidelines, three different approaches may be utilized to generate embedding vectors. The first is directly performing matrix decomposition over the adjacency matrix, so that the complex label information can be embedded into a low dimensional representation. The second is adjacency-based similarity embedding, which captures the rich semantic relations, the spatial or temporal dependencies among labels. The third is to transform the label correlations into a knowledge graph with different relations, and then learn the embeddings via a link prediction task.

To achieve fast network embedding, a randomized truncated Singular Value Decomposition ("randomized tSVD") may be utilized, which offers significant improvements of tSVD with a strong approximation guarantee. To enable randomized tSVD, Q and d orthonormal columns are determined—i.e., U≈$QQ^TU$. Assuming Q has been found, H can be defined as H=$Q^TU$, which is a small matrix (d×N) which can be efficiently decomposed. Thus, H=$S_d \Sigma_d V_d^T$ for $S_d$, $V_d$ orthogonal and $\Sigma_d$ diagonal. Finally, U can be decomposed as U≈$QQ^TU$=$(QS_d)\Sigma_d V_d^T$ and the final output embedding matrix is:

$$R_d = QS_d\Sigma_d^{1/2}$$

and each row of $R_d$ represents one node's embedding e.

For example, and again referring to FIG. 6, through sparce matrix factorization graph embedding, the symmetrical graph can be factorized into an embedding matrix 610 in which each row represents the embedding of a node of the graph. Finally, using for example, cosine similarity, the embedding matrix 610 may be reproduced as a similarity matrix 620 that illustrates the correlations between the threats, attributes, rankings, tactics, etc.

As an alternative to Sparce Matrix Factorization Graph Embedding, or in addition thereto, Adjacency-Based Similarity Graph Embedding may be utilized in which each node (label) in the graph is represented as word embeddings of the label. For categories whose names include multiple words, the label representation $o_i$ may be obtained as the average of embeddings for all words for the category.

A neural network may then be applied to map the pre-trained embedding of each label to a semantic embedding space and produce the label embedding $e_i$=Φ($o_i$), where Φ denotes the neural network which may consist of three fully-connected layers followed by Batch Normalization ("BN") and ReLU activation. The goal in such a configuration is to achieve the optimal label embedding set such that $\cos(e_i \cdot e_j)$ is close to $\tilde{A}_{ij}$ for all i,j, where $\cos(e_i \cdot e_j)$ denotes the cosine similarity between $e_i$ and $e_j$. Thereby, the objective function is defined as:

$$L_{ge} = \sum_{i=1}^{N}\sum_{j=1}^{N}\left(\frac{e_j^T e_j}{\|e_i\|\|e_j\|} - A'_{ij}\right)^2$$

where $L_{ge}$ denotes the loss of graph embedding.

As another alternative, Knowledge Graph Embedding may also be considered to determine the correlation between malicious categories. The definition of an Uncertain Knowledge Graph can be specified such that an Uncertain Knowledge Graph represents knowledge as a set of relations (R) defined over a set of entities (E). The Uncertain Knowledge Graph may consist of a set of weighted triples G={(l,$s_l$)}. For each pair (l,$s_l$), where l=(h,r,t) is a triple representing a relations fact where h, t∈ E (the set of entities) and r∈ R (the set of relations), and $s_l$∈ [0,1] represents the confidence score for this relation fact to be true.

Example relations may include, but are not limited to, "Full domain—CI—Full domain," "Full domain—IP—Full domain," "Full domain—account—Full domain," etc. "Full domain—CI—Full domain" indicates that all domains are queried by the same CI. "Full domain—IP—Full domain" indicates that all domains are resolved to the same IP address. "Full domain—account—Full domain" indicates that all domains are queried by the same account. As will be appreciated, any of a variety of relations may be determined and those provided are for example purposes only.

The confidence score $s_l$∈ [0,1] can be interpreted as the probability of existence of a link. For example:
1. (malwareFamilies:DownExecute, IP, disposition: threat): 1
2. (malwareFamilies:ChattyCRC; IP, tactics:commandAndControl): 0.49
3. (tactics:initialAccess, account, attributes:intent/malwareDelivery): 0.213
4. (tactics:exfiltration, CI, tractics:commandAndControl): 0.21

In the above first example, it means that among the domain connected via IP addresses, if a domain with the label "malwareFamilies:DownExecute," the probability of the domain being malicious (i.e., with the label "disposition: threat") is 1. Thus, based on the definition of uncertain knowledge graph, the domain labels can be formalized as a link prediction task in which high-confidence triples of the form (crowdStrike, label, commandAndControl) can be predicted using the learned embeddings.

Given an Uncertain Knowledge Graph G, the embedding model attempts to take advantage of patterns in the knowledge graph whereby certain high-supported relations may equivalently be represented by short indirect paths in the graph. Over a large knowledge graph, these patterns become encoded in the embeddings for entities and relations, enabling the interface of new high-confidence triples.

Uncertain Knowledge Graphs need to explicitly model the confidence score for each triple and compare the prediction with the true score. Accordingly, the plausibility of triples may be defined and modeled, which can be considered as an unnormalized confidence score. Given a triple l=(h,r,t) and their embeddings (h,r,t), the plausibility parameter of (h,r,t) can be defined as g(l)=r·(h∘t) where ∘ is the element-wise product, and · is the inner product. This function captures the relatedness between embeddings h and t under the condition of relation r. The resulting score may be mapped to the interval [0, 1] through a logistic function:

$$\phi(x) = \frac{1}{1 + e^{-(wx+b)}}$$

where w is a weight and b is a bias. The final predicted confidence score is thus:

$$f(l) = \Phi(g(l))$$

For every triple used in training we may also consider negative samples/triple by corrupting the tail node and re-sampling a random node with the confidence score of 0. Thus, the total loss function is the sum of squared errors between the prediction $f(l)$, and confidence score $s_l$ for each triple:

$$J = \sum_{l \in L^+} |f(l) - s_l|^2 + \sum_{l \in L^-} |f(l)|^2$$

where $L^+$ is the set of observed relation facts and $L^-$ is the sampled set of negative triples (i.e., unseen relations). The domain labels may then be formalized as a link prediction task in which high-confidence triples are predicted using the learned embeddings.

Figure 7:
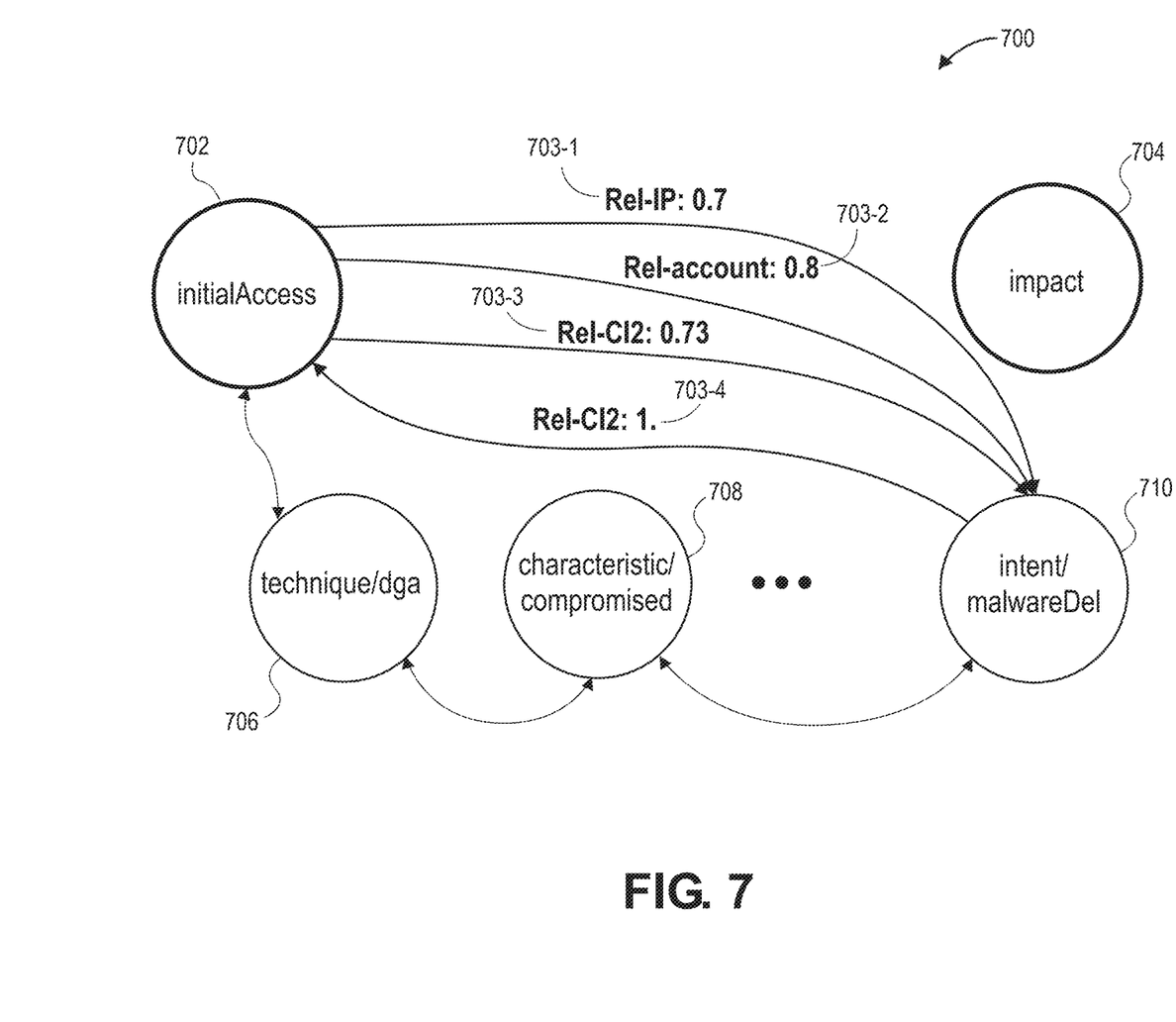
FIG. 7 is a graph illustrating prediction confidence scores determined between tactics and attributes for domains, in accordance with disclosed implementations.

FIG. 7 is a graph 700 illustrating the final predicted confidence scores $f(l)$ for a domain based on the tactics and attributes determined for the domain, in accordance with disclosed implementations.

In the illustrated graph 700, which indicates the tactics of initialAccess 702 through impact 704, and the attributes of technique/dga 706, characteristic/compromised 708, through intent/malwareDel 710, that the disclosed implementations determined the probabilities that Relation-IP 703-1 has a final predicted probability $f(l)$ of 0.7 that the node is malicious, Relation-account 703-2 has a final predicted probability $f(l)$ of 0.8 that the node is malicious, Relation-CI2 703-3 has a final predicted probability $f(l)$ of 0.73 that the node is malicious, and Relation-CI2 703-4 has a final predicted probability $f(l)$ of 1 that the node is malicious. In the illustrated example, the scores of these triples provide the degree of association or correlation between two domains labels in terms of different relations between them. The score of these triples may not be for a domain but rather for domain labels.

As discussed above, regardless of the technique used to define initial embeddings and/or the GNN, through the disclosed implementations, a monitoring service may monitor and protect CI from malicious domains and, when malicious domains are identified and blocked for a CI, the user or account associated with that CI may be provided information as to why the domain was blocked. For example, the monitoring service may provide a notification to the account/user associated with the CI notifying the user that the CI attempted to access a malicious domain and that the access was blocked. In addition, the notification may indicate a malicious classification for the domain (e.g., phishing, sinkholed, etc.), tactics determined for the domain, attributes determined for the domain, etc.

Figure 8:
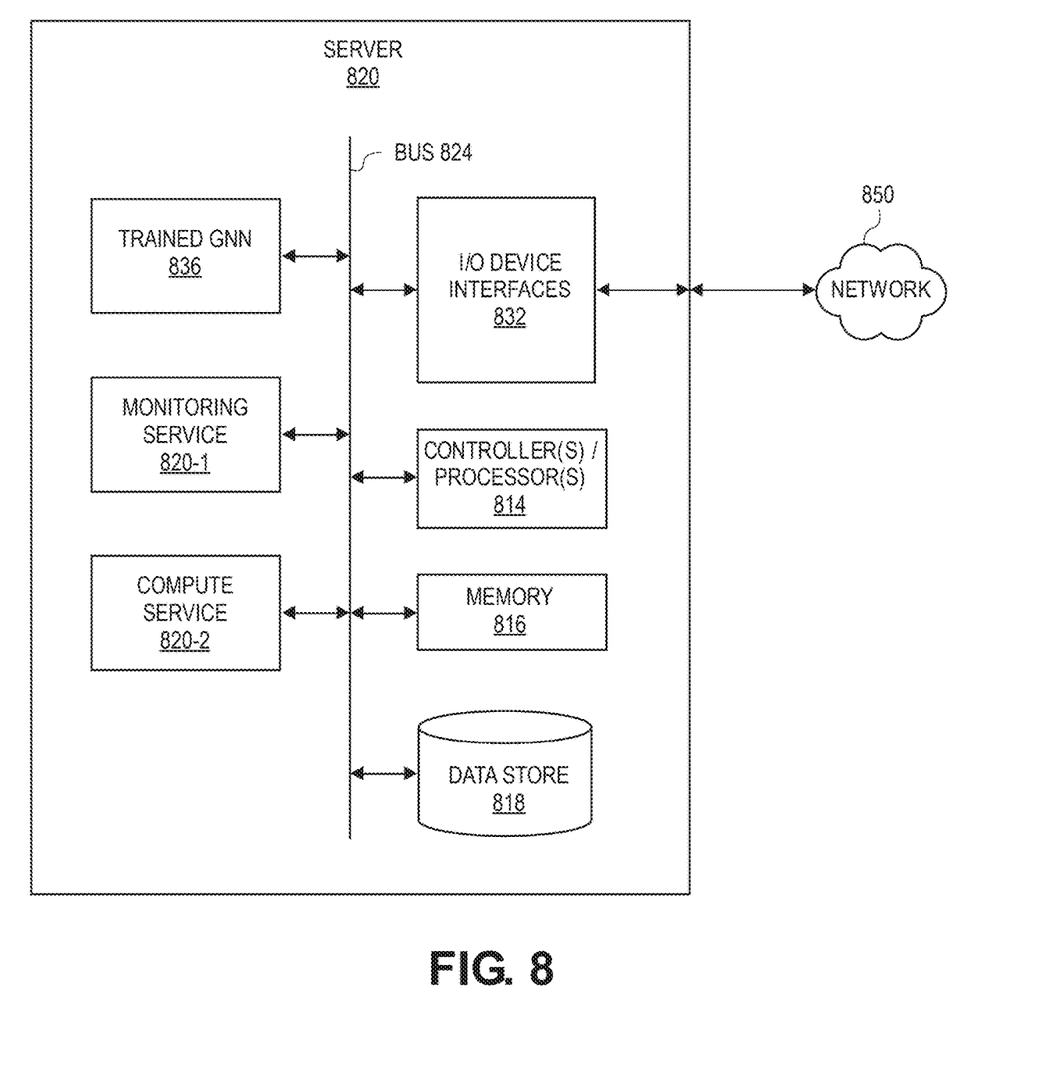
FIG. 8 illustrates example components of a server, in accordance with disclosed implementations.

FIG. 8 is a block diagram conceptually illustrating example components of a remote computing device, such as a remote server 820 that may be used to train and/or use a GNN, upon which the monitoring service is executing, and/or upon which the compute service is executing. Multiple such servers 820 may be included in the system.

Each of these server(s) 820 may include one or more controllers/processors 814, that may each include a central processing unit (CPU) for processing data and computer-readable instructions, and a memory 816 for storing data and instructions. The memory 816 may individually include volatile random access memory (RAM), non-volatile read only memory (ROM), non-volatile magnetoresistive (MRAM) and/or other types of memory. Each server may also include a data storage component 818, for storing data, controller/processor-executable instructions, training data, labels, graphs, etc. Each data storage component may individually include one or more non-volatile storage types such as magnetic storage, optical storage, solid-state storage, etc. Each server may also be connected to removable or external non-volatile memory and/or storage (such as a removable memory card, memory key drive, networked storage, etc.), internal, and/or external networks 850 (e.g., the Internet) through respective input/output device interfaces 832.

Computer instructions for operating each server 820 and its various components may be executed by the respective server's controller(s)/processor(s) 814, using the memory 816 as temporary "working" storage at runtime. A server's computer instructions may be stored in a non-transitory manner in non-volatile memory 816, storage 818, and/or an external device(s). Alternatively, some or all of the executable instructions may be embedded in hardware or firmware on the respective device in addition to or instead of software.

Each server 820 includes input/output device interfaces 832. A variety of components may be connected through the input/output device interfaces. Additionally, each server 820 may include an address/data bus 824 for conveying data among components of the respective server. Each component within a server 820 may also be directly connected to other components in addition to (or instead of) being connected to other components across the bus 824. Each server may also include one or more trained GNNs 836, the monitoring service 820-1, and/or the cloud service 820-2, as discussed herein. In some implementations, the GNNs 836 may be included in and part of the monitoring service 820-1 or may be separate from but accessible by the monitoring service 820-1. In other examples, the monitoring service 820-1 and/or the GNNs 836 may be included in and part of the cloud service 820-2. In still other examples, the cloud service 820-2 and the monitoring service 820-1 may be independent and execute on different computing resources. In such implementations, the monitoring service 820-1 may access or otherwise monitor traffic and/or instance of CIs generated by the cloud service 820-2.

The components of the server(s) 820, as illustrated in FIG. 8, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
receiving, from a first threat information service, a first threat list that indicates a first plurality of domains that are determined to be malicious;
receiving, from a second threat information service, a second threat list that indicates a second plurality of domains that are determined to be malicious; wherein:
the first threat list includes a first set of categories to categorize domains of the first plurality of domains;
the second threat list includes a second set of categories to categorize domains of the first plurality of domains; and
the first set of categories is different than the second set of categories;
combining the first threat list and the second threat list into a normalized schema that includes the first plurality of domains and the second plurality of domains;
including, in the normalized schema, a third plurality of domains that are known to be benign such that the normalized schema indicates both a plurality of malicious domains and a plurality of benign domains;
assigning, to each domain of the plurality of malicious domains, at least one of a tactic or an attribute from a defined list of tactics and attributes;
training, based at least in part on the normalized schema, a graph neural network ("GNN");
processing, with the GNN, a first domain that is not included in the normalized schema to determine that the first domain is malicious;
determining, for the first domain, at least one of a tactic or an attribute from the defined list of tactics and attributes that provides an indication as to why the first domain is determined to be malicious; and
providing an indication that the first domain is malicious and the at least one of the tactic or the attribute determined for the first domain.

2. The computer-implemented method of claim 1, further comprising:
generating, for each of a defined plurality of labels, a defined representation; and
generating, for each domain of the plurality of domains included in the normalized schema, an embedding, wherein the embedding is generated based at least in part on the defined representations and the domain; and
wherein processing the first domain includes:
generating, with the GNN, a first embedding for the first domain based at least in part on one or more of the embeddings generated for the plurality of domains included in the normalized schema; and
determining, based at least in part on the first embedding, that the first domain is malicious.

3. The computer-implemented method of claim 1, further comprising:
defining a graph that includes a plurality of nodes and a plurality of edges that interconnect nodes of the plurality of nodes, wherein:
at least some of the nodes of the plurality of nodes represent at least one of a compute instances ("CI"), a domain, an Internet Protocol ("IP") address, or an account identifier corresponding to the CI; and
the GNN is trained based at least in part on the graph.

4. The computer-implemented method of claim 3, wherein at least some of the edges of the plurality of edges are defined as a first interconnection between the domain and the CI, a second interconnection between the domain and the IP address, a third interconnection between the domain and a corresponding second level domain and top-level domain ("TLD") pair, a fourth interconnection between the domain and a Canonical Name Records ("CNAME") record, or a fifth interconnection between the domain and the account identifier corresponding to the CI.

5. The computer-implemented method of claim 1, further comprising:
monitoring a plurality of compute instances;
determining that a first compute instance of the plurality of compute instances is attempting to access the first domain; and
in response to determining that the first domain is malicious, blocking access to the first domain by the first compute instance.

6. A computing system, comprising:
one or more processors; and
a memory storing program instructions that, when executed by the one or more processors, cause the one or more processors to at least:
maintain a graph representative of a plurality of domains, wherein:
a first sub-plurality of domains of the plurality of domains are known to be benign domains;
a second sub-plurality of domains of the plurality of domains are known to be malicious; and
a first domain of the plurality is unknown as to whether the first domain is malicious or benign;
process, with a graph neural network ("GNN"), the graph to determine that the first domain is malicious; and
in response to determination that the first domain is malicious:
determine, for the first domain, at least one of a tactic, an attribute, or a classification that indicates why the first domain is malicious; and
block an access with the first domain.

7. The computing system of claim 6, wherein the tactic, the attribute, or the classification is determined from a defined list of tactics, attributes, and classifications.

8. The computing system of claim 7, wherein the at least one of the tactic, the attribute, or the classification is represented by a defined feature that is included in an embedding generated by the GNN for the first domain.

9. The computing system of claim 6, wherein the program instructions that, when executed by the one or more processors to process the graph to determine that the first domain is malicious, further include instructions that, when executed by the one or more processors, further cause the one or more processors to at least:
perform a message passing among nodes of the plurality of domains to determine an embedding for the first domain; and
determine, based at least in part on the embedding, that the first domain is malicious.

10. The computing system of claim 6, wherein the graph further includes, for each domain of the second sub-plurality of domains, at least one of the tactic or the attribute.

11. The computing system of claim 10, wherein the program instructions that, when executed by the one or more processors, further cause the one or more processors to at least:
periodically update and process the graph to determine, for each domain of the plurality of domains, whether the domain is benign or malicious.

12. The computing system of claim 6, wherein:
the graph further includes, for each domain of the plurality of domains, an embedding representative of the domain; and
features included in each embedding are selected from a defined set of features.

13. The computing system of claim 6, wherein:
the graph includes a plurality of nodes and a plurality of edges;
at least some of the nodes of the plurality of nodes represent at least one of a compute instances ("CI"), a domain of the plurality of domains, an Internet Protocol ("IP") address, or an account identifier corresponding to the CI; and
at least some of the edges of the plurality of edges are defined as a first interconnection between the domain and the CI, a second interconnection between the domain and the IP address, a third interconnection between the domain and a corresponding second level domain and top-level domain ("TLD") pair, a fourth interconnection between the domain and a Canonical Name Records ("CNAME") record, or a fifth interconnection between the domain and the account identifier corresponding to the CI.

14. The computing system of claim 6, wherein the program instructions that, when executed by the one or more processors, further cause the one or more processors to at least:
monitor a compute instance ("CI") to detect an attempted access to the first domain;
in response to the attempted access, process the graph to determine that the first domain is malicious; and
block the access between the CI and the first domain.

15. The computing system of claim 6, wherein the program instructions that, when executed by the one or more processors, further cause the one or more processors to at least:
in response to determination that the first domain is malicious, send an indication as to why the first domain is determined to be malicious.

16. A method, comprising:
defining a first node of a graph as a first embedding representative of a benign domain;
defining a second node of the graph as a second embedding representative of a malicious domain;
defining a third node of the graph as corresponding to a first domain that is unknown as to whether the first domain is a malicious domain or a benign domain;
processing the graph with a graph neural network to determine a third embedding for the third node, wherein the third embedding is determined based at least in part on the first embedding, the second embedding, and at least one edge that interconnects the third node to a fourth node that is also connected to at least one of the first node and the second node;
determining, based at least in part on the third embedding, that the first domain is malicious and at least one of a tactic or an attribute determined for the first domain; and
in response to determining that the first domain is malicious, blocking an access with the first domain.

17. The method of claim 16, further comprising:
generating the first embedding based at least in part on features defined for a plurality of labels.

18. The method of claim 16, further comprising:
generating the second embedding to include a representation of at least one of a second tactic or a second attribute that indicates why the first domain is malicious.

19. The method of claim 16, further comprising:
in response to determining that the first domain is malicious, generating an indication as to why the first domain is malicious.

20. The method of claim 16, further comprising:
defining the second embedding based on one or more of a matrix decomposition over an adjacency matrix, an adjacency-based similarity embedding, or a transformation of label correlations into a knowledge graph with a plurality of relations.

* * * * *